United States Patent
Chu et al.

(10) Patent No.: US 11,750,329 B2
(45) Date of Patent: Sep. 5, 2023

(54) APPARATUS AND METHOD FOR BLOCK ACKNOWLEDGEMENT MANAGEMENT IN MULTI-LINK COMMUNICATION SYSTEMS

(71) Applicant: NXP USA, Inc., Austin, TX (US)

(72) Inventors: Liwen Chu, San Ramon, CA (US); Young Hoon Kwon, Laguna Niguel, CA (US); Hongyuan Zhang, Fremont, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 3 days.

(21) Appl. No.: 17/138,810

(22) Filed: Dec. 30, 2020

(65) Prior Publication Data

US 2021/0211235 A1 Jul. 8, 2021

Related U.S. Application Data

(60) Provisional application No. 62/957,177, filed on Jan. 4, 2020, provisional application No. 62/980,173, filed on Feb. 22, 2020, provisional application No. 62/984,576, filed on Mar. 3, 2020.

(51) Int. Cl.
*H04W 28/02* (2009.01)
*H04L 1/1607* (2023.01)
*H04W 80/02* (2009.01)

(52) U.S. Cl.
CPC .......... *H04L 1/1621* (2013.01); *H04L 1/1642* (2013.01); *H04W 28/0263* (2013.01); *H04W 28/0268* (2013.01); *H04W 80/02* (2013.01)

(58) Field of Classification Search
None
See application file for complete search history.

(56) References Cited

U.S. PATENT DOCUMENTS

| | | | | |
|---|---|---|---|---|
| 2006/0092871 A1* | 5/2006 | Nishibayashi | ........ | H04L 1/1685 370/328 |
| 2018/0069663 A1* | 3/2018 | Du | .......... | H04L 1/1864 |
| 2019/0036651 A1* | 1/2019 | Chitrakar | .............. | H04L 1/1685 |
| 2019/0364555 A1* | 11/2019 | Huang | ................ | H04W 72/048 |
| 2021/0083805 A1* | 3/2021 | Kneckt | ................. | H04L 1/1854 |
| 2021/0211234 A1* | 7/2021 | Kneckt | ................. | H04L 1/1685 |

OTHER PUBLICATIONS

Chu, Liwen et al; "A -MPDU and BA—IEEE Document 802.11-19/1856r"; 14 pages (Nov. 6, 2019).
IEEE Computer Society; "IEEE Standard for Information technology—Telecommunications and information exchange between systems—Local and metropolitan area networks—Specific Requirements—Part 11: Wireless LAN Medium Access Control (MAC) and Physical Layer (PHY) Specifications—Amendment 5: Enhancements for Higher Throughput"; 536 panes (Oct. 29, 2009).

* cited by examiner

*Primary Examiner* — Jason E Mattis
*Assistant Examiner* — Bao G Nguyen

(57) ABSTRACT

Embodiments of an apparatus and method are disclosed. In an embodiment, a method of executing block acknowledgement operations in a multi-link communications system comprises transmitting a request for block acknowledgement response from a first multi-link device to a second multi-link device, wherein the request is either in quality of service (QoS) data frames of aggregated-media access control (MAC) protocol data unit (A-MPDU) or a block acknowledgement request, and receiving a block acknowledgment from the second multi-link device by the first multi-link device.

19 Claims, 14 Drawing Sheets

APPARATUS AND METHOD FOR BLOCK ACKNOWLEDGEMENT MANAGEMENT IN MULTI-LINK COMMUNICATION SYSTEMS

CROSS-REFERENCE TO RELATED APPLICATIONS

This application is entitled to the benefit of U.S. Provisional Patent Application Ser. No. 62/957,177, filed on Jan. 4, 2020, U.S. Provisional Patent Application Ser. No. 62/980,173, filed on Feb. 22, 2020, and U.S. Provisional Patent Application Ser. No. 62/984,576, filed on Mar. 3, 2020, which are incorporated herein by reference.

BACKGROUND

In multi-link communications, multi-link devices, e.g., access point (AP) multi-link logical devices (MLDs) or non-AP MLDs, execute block acknowledgment operations, such as transmitting block acknowledgment requests and responding with block acknowledgments. These block acknowledgment requests and block acknowledgments need to contain various information to successfully execute the block acknowledgment operations. Thus, there is a need to design block acknowledgment requests and block acknowledgments that includes all the needed information to efficiently execute the block acknowledgment operations.

SUMMARY

Embodiments of an apparatus and method are disclosed. In an embodiment, a method of executing block acknowledgement operations in a multi-link communications system comprises transmitting a request for block acknowledgment response from a first multi-link device to a second multi-link device, wherein the request is either in quality of service (QoS) data frames of aggregated-media access control (MAC) protocol data unit (A-MPDU) or a block acknowledgement request, and receiving a block acknowledgment from the second multi-link device by the first multi-link device.

In an embodiment, the request for block acknowledgement response includes sequence number bits in a starting sequence number field and additional sequence number bits in another field of the request.

In an embodiment, the additional sequence number bits are in a fragment number field of a block ack start sequence control field in the request.

In an embodiment, the block acknowledgement request includes an indication whether a recipient of the block acknowledgement request needs to update at least one of WinStartB and WinStartR value when a block acknowledgement agreement with the recipient is not a protected block agreement.

In an embodiment, one block acknowledgement bitmap field in the block acknowledgement is used to acknowledge QoS data frames of a traffic identification (TID) from an A-MPDU source.

In an embodiment, a plurality of bits in a fragment number field of a starting sequence number control field of a block acknowledgement information field in the block acknowledgement indicates that a block acknowledgment bitmap field is more than 256 bits and also indicates size of the block acknowledgment bitmap field.

In an embodiment, B3 of fragment number field being equal to 1, B0 of fragment number field being equal to 0 and various values of B2 and B1 of fragment number field indicate the block acknowledgment bitmap field with bit length of 512 or 1024.

In an embodiment, the block acknowledgement is carried in greater than 20 MHz Extremely High Throughput (EHT) physical protocol data unit (PPDU).

In an embodiment, a block acknowledgement bitmap length of the block acknowledgement is based on a difference of sequence numbers of acknowledged frames instead of a negotiated block acknowledgement buffer size.

In an embodiment, the block acknowledgement request is carried in an A-MPDU to announce a starting sequence number of a solicited block acknowledgement.

In an embodiment, a multi-link communications system comprises a first multi-link device, and a second multi-link device, wherein the first multi-link device is configured to transmit a request for block acknowledgment response to the second multi-link device, wherein the request is either in quality of service (QoS) data frames of aggregated-media access control (MAC) protocol data unit (A-MPDU) or a block acknowledgement request, and wherein the second multi-link device is configured to transmit a block acknowledgment to the second multi-link device.

In an embodiment, the request for block acknowledgement response includes sequence number bits in a starting sequence number field and additional sequence number bits in another field of the request.

In an embodiment, the additional sequence number bits are in a fragment number field of a block ack start sequence control field in the request.

In an embodiment, the request includes an indication whether a recipient of the request needs to update at least one of WinStartB and WinStartR value when a block acknowledgement agreement with the recipient is not a protected block agreement.

In an embodiment, one block acknowledgement bitmap field in the block acknowledgement is used to acknowledge QoS data frames of a traffic identification (TID) from an A-MPDU source.

In an embodiment, a plurality of bits in a fragment number field of a starting sequence number control field of a block acknowledgement information field in the block acknowledgement indicates that a block acknowledgment bitmap field is more than 256 bits and also indicates size of the block acknowledgment bitmap field.

In an embodiment, B3 of fragment number field being equal to 1, B0 of fragment number field being equal to 0 and various values of B2 and B1 of fragment number field indicate the block acknowledgment bitmap field with bit length of 512 or 1024.

In an embodiment, a block acknowledgement bitmap length of the block acknowledgement is based on a difference of sequence numbers of acknowledged frames instead of a negotiated block acknowledgement buffer size.

In an embodiment, a multi-link device of a multi-link communications system comprises a processor configured to transmit a request for block acknowledgement response to a second multi-link device of the multi-link communications system, wherein the request is either in quality of service (QoS) data frames of aggregated-media access control (MAC) protocol data unit (A-MPDU) or a block acknowledgement request, and receive a block acknowledgment from the second multi-link device.

In an embodiment, the request for block acknowledgement response includes sequence number bits in a starting sequence number field and additional sequence number bits in another field of the request.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
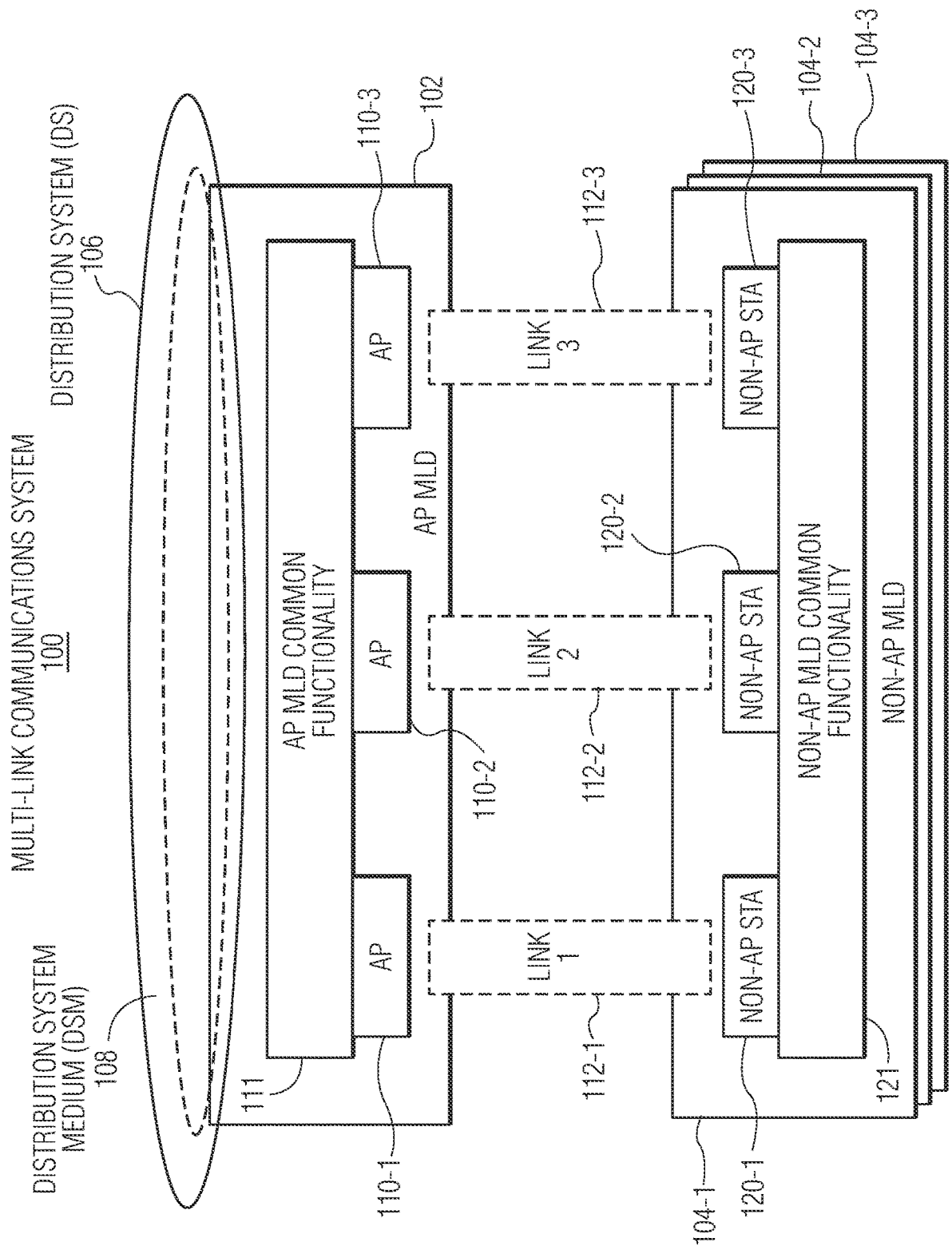
FIG. 1 depicts a multi-link communications system in accordance with an embodiment of the invention.

FIG. 1 depicts a multi-link communications system 100 in accordance with an embodiment of the invention. In the embodiment depicted in FIG. 1, the multi-link communications system includes at least one AP MLD 102, and multiple non-AP MLDs 104-1, 104-2, 104-3. The multi-link communications system can be used in various applications, such as industrial applications, medical applications, computer applications, and/or consumer or appliance applications. In some embodiments, the multi-link communications system is a wireless communications system, such as a wireless communications system compatible with an Institute of Electrical and Electronics Engineers (IEEE) 802.11 protocol. For example, the multi-link communications system may be a wireless communications system compatible with an IEEE 802.11be protocol. In some embodiments, the multi-link communications system includes one or more AP MLDs and/or one or more non-AP MLDs. Although the depicted multi-link communications system 100 is shown in FIG. 1 with certain components and described with certain functionality herein, other embodiments of the multi-link communications system 100 may include fewer or more components to implement the same, less, or more functionality. For example, in some embodiments, the multi-link communications system includes multiple AP MLDs, more than three non-AP MLDs, and/or less than three non-AP MLDs. In yet another example, although the multi-link communications system 100 is shown in FIG. 1 as being connected in a certain topology, the network topology of the multi-link communications system 100 is not limited to the topology shown in FIG. 1.

In the embodiment depicted in FIG. 1, the AP MLD 102 includes multiple APs 110-1, 110-2, 110-3, and one common entity 111. The APs implement the features related to the specific links, e.g., medium access and frame transmission/reception. The common entity includes the features shared by all links (APs), e.g., non-AP MLD management, and reordering of the received data frames before transmitting them to the up layer. The APs 110-1, 110-2, 110-3 may be implemented in hardware (e.g., circuits), software, firmware, or a combination thereof. The APs 110-1, 110-2, 110-3 may be fully or partially implemented as an integrated circuit (IC) device. In some embodiments, the APs 110-1, 110-2, 110-3 are wireless APs compatible with at least one WLAN communications protocol (e.g., at least one IEEE 802.11 protocol). For example, the APs 110-1, 110-2, 110-3 may be wireless APs compatible with an IEEE 802.11be protocol. In some embodiments, an AP is a wireless AP that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, an AP includes at least one antenna, at least one transceiver operably connected to the at least one antenna, and at least one controller operably connected to the corresponding transceiver. In some embodiments, the least one transceiver includes a physical layer (PHY) device. The at least one controller operably may be configured to control the at least one transceiver to process received packets through the at least one antenna. In some embodiments, the at least one controller is implemented within a processor, such as a microcontroller, a host processor, a host, a digital signal processor (DSP), or a central processing unit (CPU), which can be integrated in a corresponding transceiver. Each of the APs 110-1, 110-2, 110-3 of the AP MLD may operate in a different frequency band. For example, the AP 110-1 may operate in 2.4 gigahertz (GHz) frequency band, the AP 110-2 may operate in 5 GHz frequency band, and the AP 110-3 may operate in 6 GHz frequency band. In the embodiment depicted in FIG. 1, the AP MLD is connected to a distribution system (DS) 106 through a distribution system medium (DSM) 108. The distribution system (DS) 106 may be a wired network or a wireless network that is connected to a backbone network such as the Internet. The DSM 108 may be a wired medium (e.g., Ethernet cables, telephone network cables, or fiber optic cables) or a wireless medium (e.g., infrared, broadcast radio, cellular radio, or microwaves). Although the AP MLD 102 is shown in FIG. 1 as including three APs, other embodiments of the AP MLD 102 may include fewer than three APs or more than three APs. In addition, although some examples of the DSM 108 are described, the DSM 108 is not limited to the examples described herein.

In the embodiment depicted in FIG. 1, the non-AP MLD 104-1 includes multiple non-AP stations (STAs) 120-1, 120-2, 120-3, and one common entity 121. The STAs implement the features related to the specific links, e.g., medium access and frame transmission/reception. The common entity includes the features shared by all links (STAs), e.g., association state maintenance with the AP MLD 102 and reordering of the received data frames before transmitting them to the up layer. The STAs 120-1, 120-2, 120-3 may be implemented in hardware (e.g., circuits), software, firmware, or a combination thereof. The STAs 120-1, 120-2, 120-3 may be fully or partially implemented as an IC device. In some embodiments, the non-AP STAs 120-1, 120-2, 120-3 are wireless devices that wirelessly connect to wireless APs. For example, at least one of the non-AP STAs 120-1, 120-2, 120-3 may be a laptop, a desktop personal computer (PC), a mobile phone, or other wireless device that supports at least one WLAN communications protocol. In some embodiments, the non-AP STAs 120-1, 120-2, 120-3 are wireless devices compatible with at least one IEEE 802.11 protocol (e.g., an IEEE 802.11be protocol). In some embodiments, the non-AP MLD has one Media Access Control (MAC) data service interface. In an embodiment, a single address is associated with the MAC data service interface and is used to communicate on the DSM 108. In some embodiments, the AP MLD 102 and/or the non-AP MLDs 104-1, 104-2, 104-3 identify which communications links support the multi-link operation during a multi-link operation setup phase and/or exchanges information regarding multi-link capabilities during the multi-link operation setup phase. Each of the non-AP STAs 120-1, 120-2, 120-3 of the non-AP MLD may operate in a different frequency band. For example, the non-AP STA 120-1 may operate in 2.4 GHz frequency band, the non-AP STA 120-2 may operate in 5 GHz frequency band, and the non-AP STA 120-3 may operate in 6 GHz frequency band. Each of the non-AP MLDs 104-2, 104-3 may be the same as or similar to the non-AP MLD 104-1. For example, the non-AP MLD 104-2 or 104-3 includes multiple non-AP STAs. In some embodiments, each STA includes at least one antenna, at least one transceiver operably connected to the at least one antenna, and at least one controller connected to the corresponding transceiver. In some embodiments, the at least one transceiver includes a PHY device. The at least one controller operably may be configured to control the at least one transceiver to process received packets through the at least one antenna. In some embodiments, the at least one controller is implemented within a processor, such as a microcontroller, a host processor, a host, a DSP, or a CPU, which can be integrated in a corresponding transceiver.

In the embodiment depicted in FIG. 1, the non-AP MLD 104-1, 104-2, or 104-3 communicates with the AP MLD 102 through multiple communications links 112-1, 112-2, 112-3. For example, each of the non-AP STAs 120-1, 120-2, 120-3 communicates with an AP 110-1, 110-2, or 110-3 through a corresponding communications link 112-1, 112-2, or 112-3. Although the non-AP MLD 104-1 is shown in FIG. 1 as including three non-AP STAs, other embodiments of the non-AP MLD 104-1 may include fewer than three non-AP STAs or more than three non-AP STAs. In addition, although the AP MLD 102 communicates (e.g., wirelessly communicates) with the non-AP MLDs 104-1, 104-2, 104-3 through multiple links 112-1, 112-2, 112-3, in other embodiments, the AP MLD 102 may communicate (e.g., wirelessly communicates) with the non-AP MLDs through more than three communications links or less three than communications links.

Figure 2:
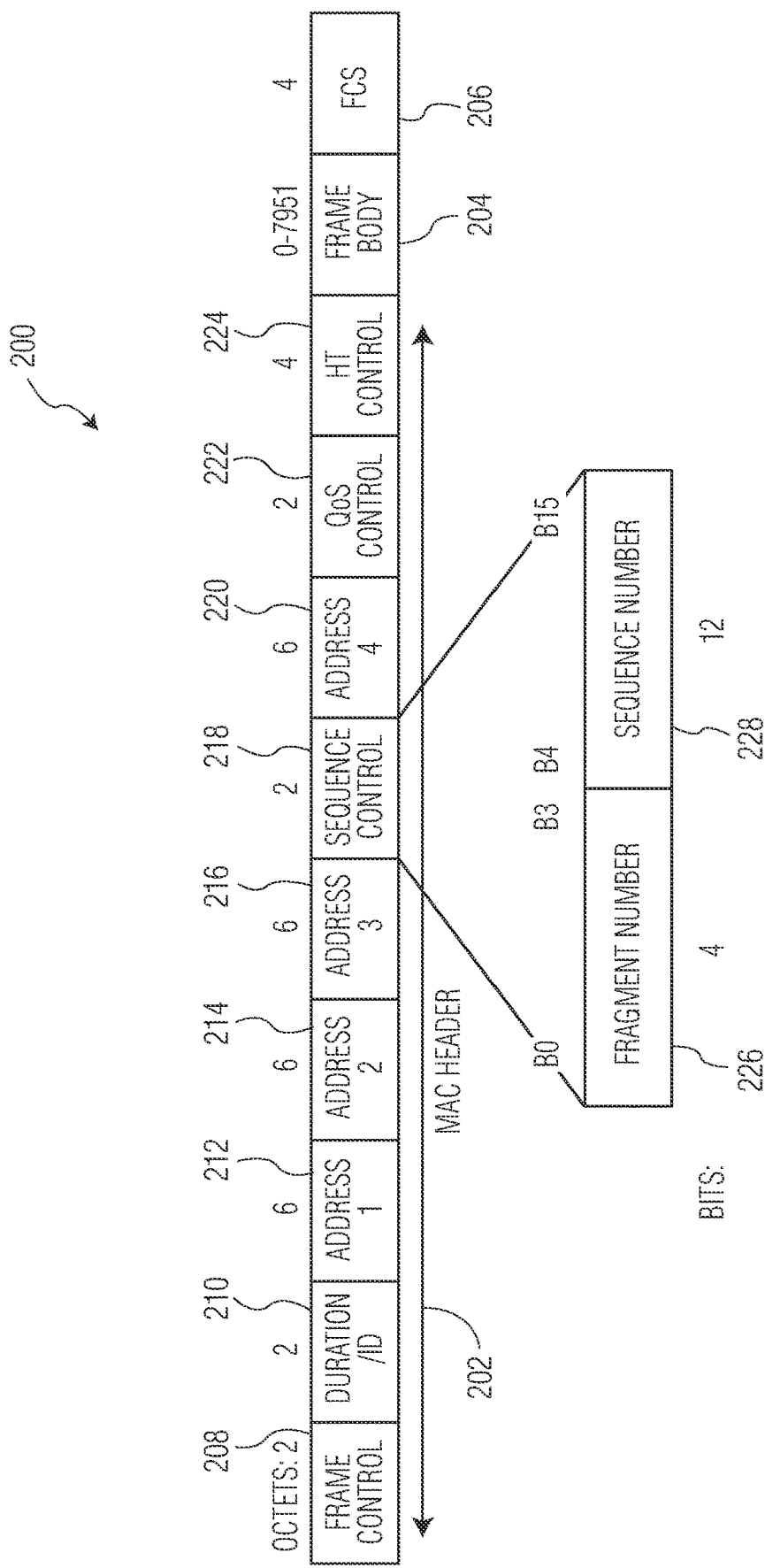
FIG. 2 shows a Media Access Control (MAC) Protocol Data Unit (MPDU) that can be used in the multi-link communications system in accordance with an embodiment of the invention.

Turning now to FIG. 2, a MAC Protocol Data Unit (MPDU) 200, which is a wireless frame, that can be used in the multi-link communications system 100 in accordance with an embodiment of the invention is shown. The MPDU is a quality of service (QoS) data frame. As shown in FIG. 2, the MPDU 200 includes a MAC header 202, a frame body 204 and a frame check sequence (FCS) 206. In the illustrated embodiment, the MAC header 202 includes a Frame Control field 208, a Duration Identification (ID) 210, an Address 1 field 212, an Address 2 field 214, an Address 3 field 216, a Sequence Control field 218, an Address 4 field 220, a Quality of Service (QoS) Control field 222, and an HT control 224. The Sequence Control field 218 includes a Fragment Number field 226 and a Sequence Number field 228.

Figure 3:
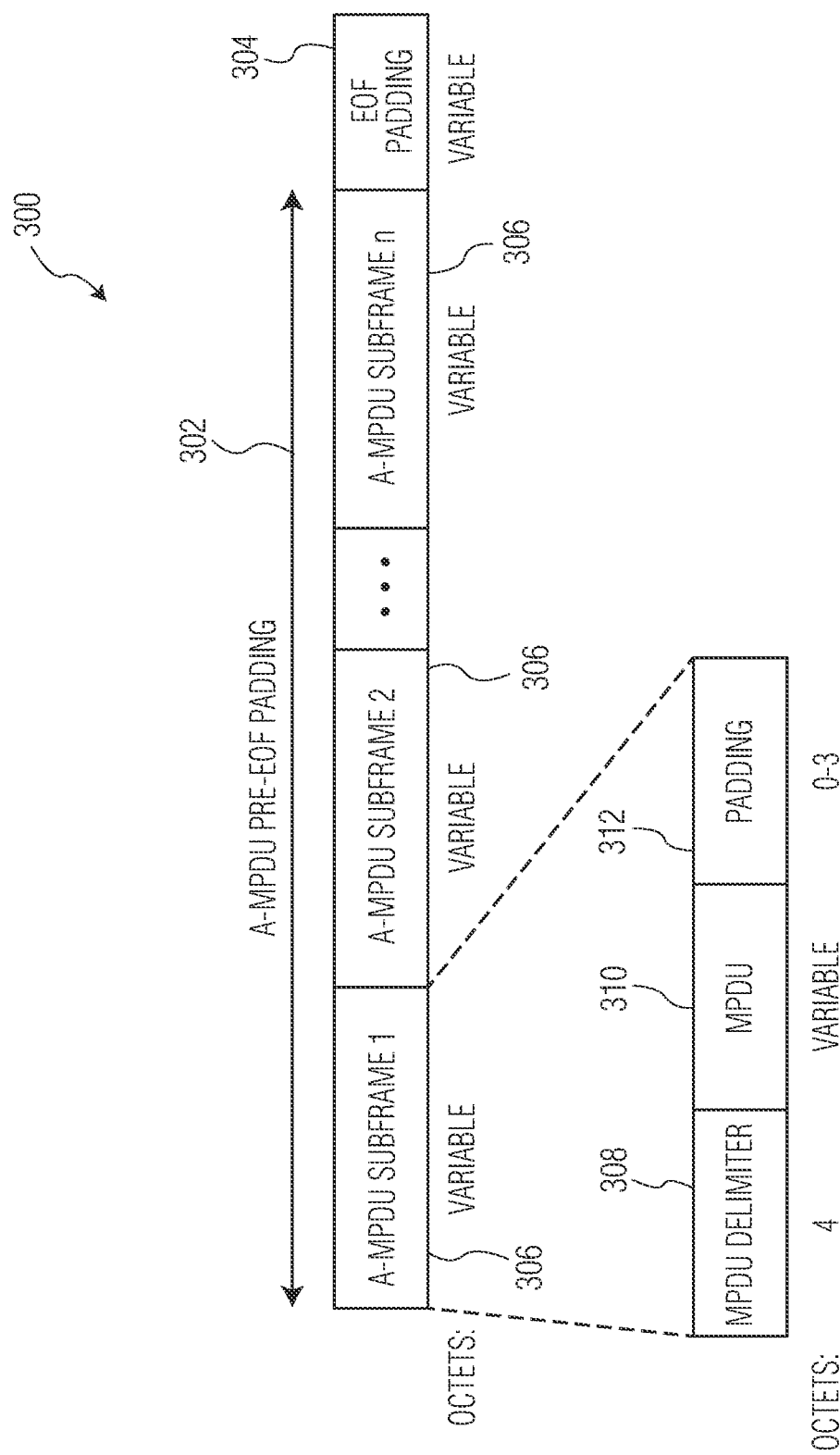
FIG. 3 shows an aggregated-MPDU (A-MPDU) that can be used in the multi-link communications system in accordance with an embodiment of the invention.

MPDUs, such as the MPDU 200, may be aggregated and transmitted as an aggregated-MPDU (A-MPDU) 300, which is shown in FIG. 3. The A-MPDU 300 in accordance with an embodiment of the invention includes an A-MPDU pre-End-of-Frame (pre-EOF) padding 302 and an EOF Padding 304. The A-MPDU pre-EOF padding 302 includes a number of A-MPDU subframes 306. As shown in FIG. 3, each A-MPDU subframe 306 includes an MPDU delimiter 308, an MPDU 310 and padding 312.

Figure 4:
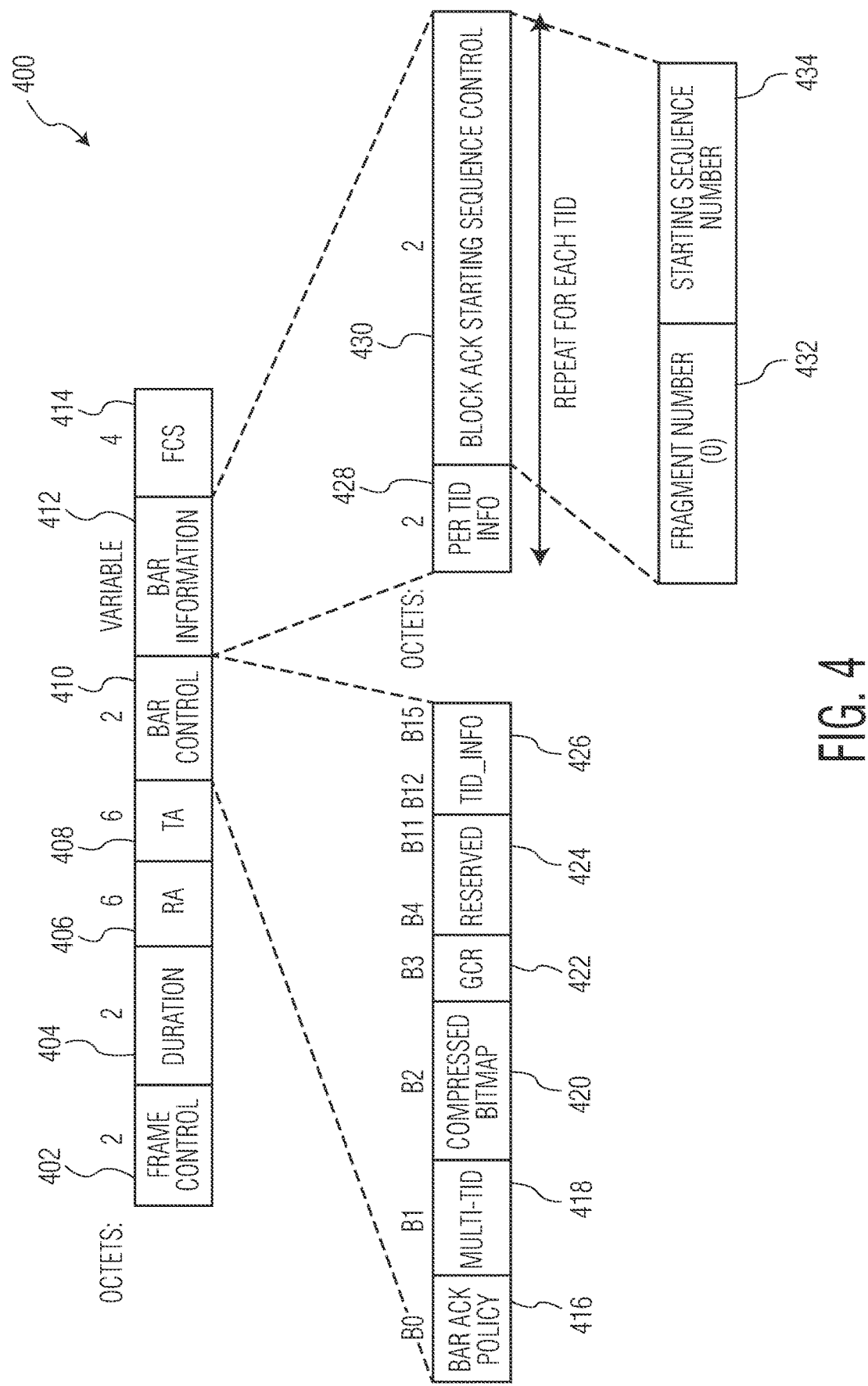
FIG. 4 shows a block acknowledgment request (BAR) that can be used in the multi-link communications system in accordance with an embodiment of the invention.

For block acknowledgment operations, block acknowledgement requests (BARs) and block acknowledgements (BAs), which are MPDU control frames, are exchanged. A BAR 400 that can be used in the multi-link communications system 100 in accordance with an embodiment of the invention is shown in FIG. 4. As depicted in FIG. 4, the BAR 400 includes a Frame Control field 402, a Duration field 404, a Receiver Address (RA) field 406, a Transmitter Address (TA) field 408, a BAR Control field 410, a BAR Information field 412 and an FCS 414. The BAR Control field 410 includes a BAR Ack Policy field 416, a Multi-Traffic Identification (TID) field 418, a Compressed Bitmap field 420, a Groupcast with Retries (GCR) field 422, a Reserved field 424, and a TID Information field 426. If the BAR 400 is a multi-TID BAR, the BAR Information field 412 includes a Per TID Information field 428 and a Block Ack Starting Sequence Control field 430, which is repeated for each TID. The Block Ack Starting Sequence Control field 430 includes a Fragment Number field 432 and a Starting Sequence Number field 434.

Figure 5:
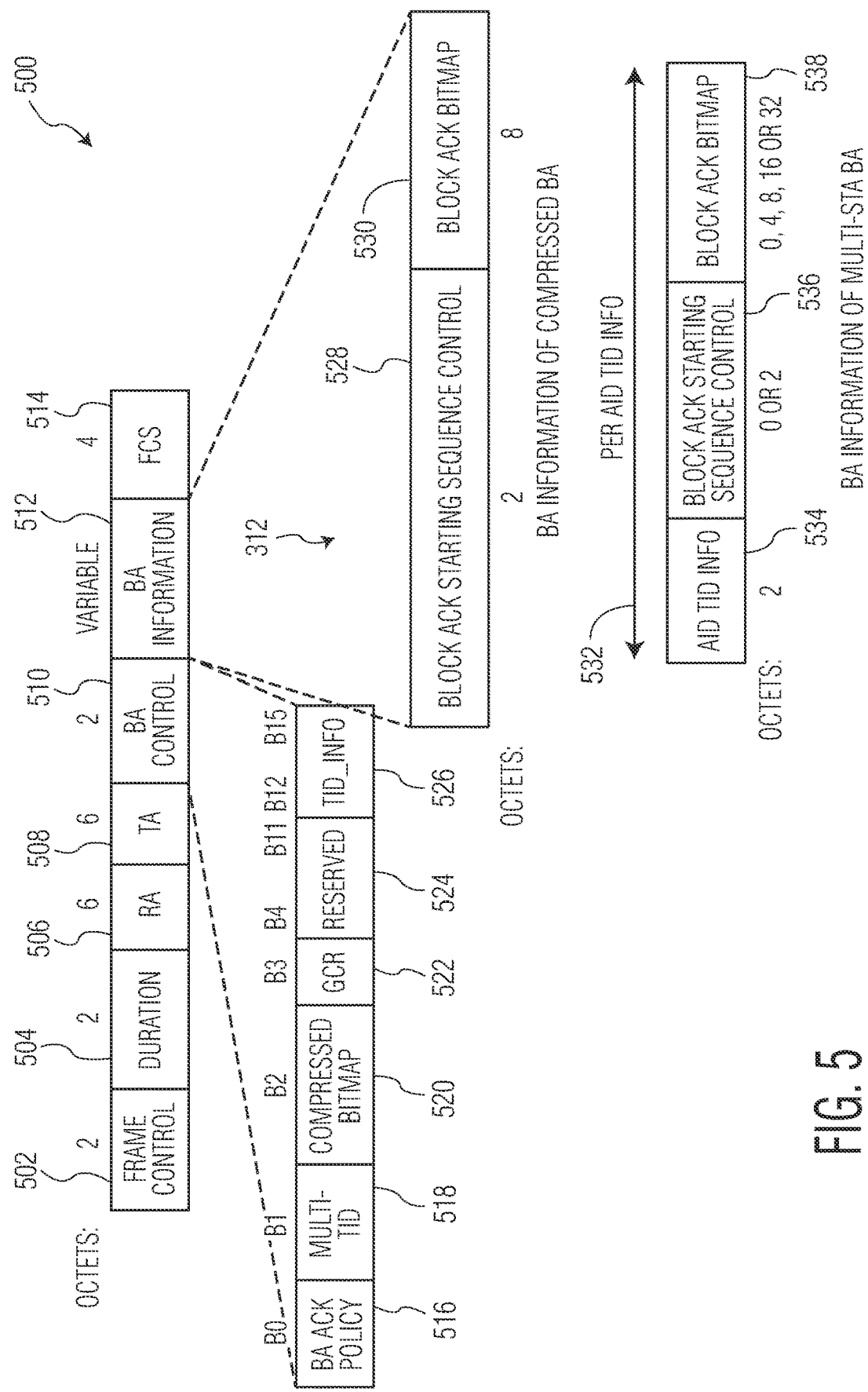
FIG. 5 shows a block acknowledgment (BA) that can be used in the multi-link communications system in accordance with an embodiment of the invention.

A BA 500 that can be used in the multi-link communications system 100 in accordance with an embodiment of the invention is shown in FIG. 5. The BA may be solicited by a BAR or an A-MPDU as a request for block acknowledgement response. As depicted in FIG. 5, the BA 500 includes a Frame Control field 502, a Duration field 504, a Receiver Address (RA) field 506, a Transmitter Address (TA) field 508, a BA Control field 510, a BA Information field 512 and an FCS 514. The BA Control field 510 includes a BA Ack Policy field 516, a Multi-TID field 518, a Compressed Bitmap field 520, a GCR field 522, a Reserved field 524, and a TID Information field 526. If the BA 500 is a compressed BA, the BAR Information field 512 includes a Block Ack Starting Sequence Control field 528 and a Block Ack Bitmap field 530. If the BA 500 is a multi-STA BA, the BAR Information field 512 includes a Per AID TID Information field 532, which is repeated for each <AID, TID> tuple. The Per AID TID Information field 532 includes an AID TID Information field 534, a Block Ack Starting Sequence Control field 536 and a Block Ack Bitmap field 538.

Figure 6:
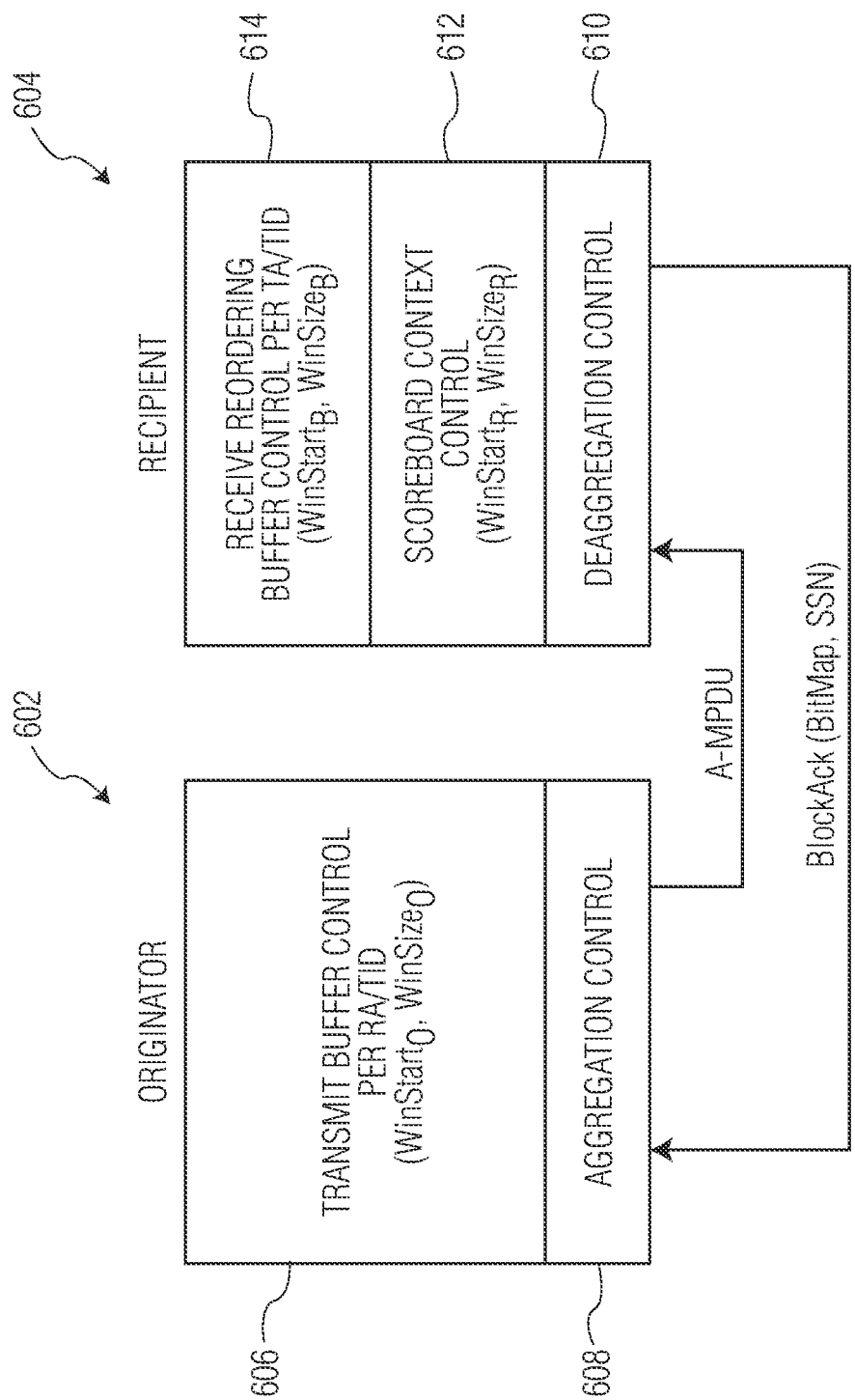
FIG. 6 is a block diagram of an originator and a recipient, illustrating an exchange of an A-MPDU and a BA, in accordance with an embodiment of the invention.

Turning now to FIG. 6, a block diagram of an originator 602, e.g., the AP MLD 102, and a recipient 604, e.g., the non-AP MLD 104-2, illustrating an exchange of an A-MPDU and a BA, in accordance with an embodiment of the invention is shown. The originator 602 includes a transmit buffer control 606 and an aggregation control 608, which are functional components of the originator. The transmit buffer control 606 operates to define the size of a transmit buffer per RA/TID as $WinStart_O$ and $WinSize_O$ to receive multiple MPDUs. The aggregation control 608 operates to aggregate the multiple MPDUs to form an A-MPDU, which is transmitted to the recipient 604. The recipient 604 includes a disaggregation control 610, a scoreboard context control 612, and a receive reorder buffer control 614, which are functional components of the recipient. The disaggregation control 610 operates to deaggregate the received A-MPDU to separate the A-MPDU subframes to retrieve the MPDUs. The scoreboard context control operates to define the buffer size as $WinStart_R$ and $WinSize_R$ to keep track of MPDUs that have been properly received and to create a BA, which is transmitted back to the originator 602. The BA includes at least a bitmap and a start sequence number, which is the sequence number of the oldest data frame from the originator 602. The receive reordering buffer control 614 operates to define the size of a reordering buffer per RA/TID as $WinStart_B$ and $WinSize_B$ to recorder the received MPDUs in a proper order to send to the upper layer.

BAR for Larger BA Buffer Sizes

In some embodiments, BAR needs to be changed or modified for larger BA buffer sizes. BAR change is not required when the negotiated BA buffer size is no more than 1024. In some embodiments, BAR needs to be changed or modified for larger BA buffer sizes. BAR change is not required when the negotiated BA buffer size is no more than 1024. In some embodiments, BAR change may not be required when the negotiated BA buffer size is more than 1024 and no more than 2048. However, BAR change may be required when the negotiated BA buffer size is more than 1024 and no more than 2048 if greater than 4096 sequence number space is required. BAR change is required when the negotiated BA buffer size is more than 2048 because greater than 4096 sequence number space requires additional sequence number bits.

In one embodiment, some bits in the Fragment Number subfield of a Block Ack Start Sequence Control field can be used to carry the additional sequence number bits. This method can be used for compressed BARs and multi-TID BARs. This method may be applied in Extremely High Throughput (EHT) MPDUs and in frames from an EHT AP/STA to another EHT STA/AP using the Fragment Number subfield of the Sequence Control in the MAC header of the frame.

In another embodiment, for compressed BARs, some reserved bits in the BAR Control field can be used to carry the additional sequence number bits for the compressed BARs. In this embodiment, for multi-TID BARs, some reserved bits in the Per TID Info field can be used to carry the additional sequence number bits in the multi-TID BARs.

In still another embodiment, some reserved bits in the BAR Control field can be used to carry the additional sequence number bits.

Figure 7:
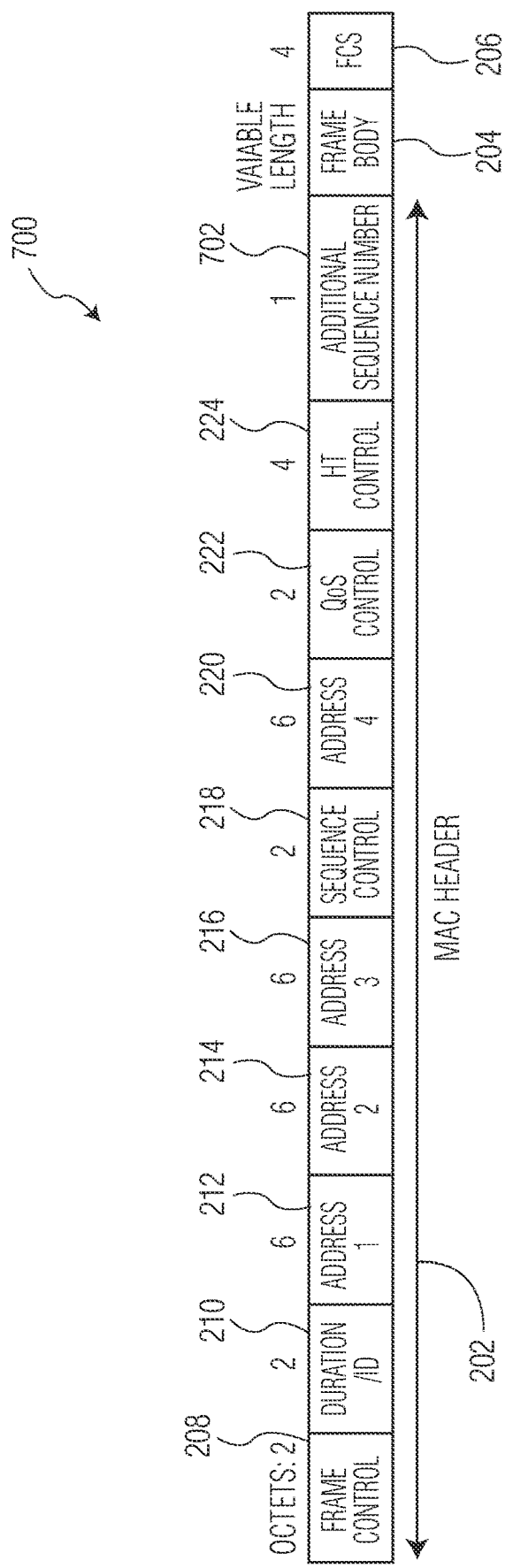
FIG. 7 shows a new MPDU that includes an Additional Sequence Number field in accordance with an embodiment of the invention.

In still another embodiment, a new optional field "Additional Sequence Number" is added in the MAC header to carry the additional sequence number bits, as illustrated in FIG. 7. As shown in FIG. 7, a new MPDU 700 in accordance with this embodiment includes an Additional Sequence Number field 702, in addition to other common MPDU fields, which were described above with respect to the MPDU 200. The length of the new Additional Sequence Number field 702 may be 1 octet.

BAR for Larger BA Buffer Size and No $WinStart_{B/R}$ Update Indication

For a block acknowledgement (ack) agreement that is not a protected block agreement, a BAR may need to indicate whether the recipient of the BAR needs to update the $WinStart_B$/$WinStart_R$ under multi-link operation. This can avoid the discarding of retransmitted frame in receive reordering buffer or the discarding of reception record in the scoreboard context control if the following happen: (1) the initial frame retransmission and the frame retransmission are in different links, (2) the BAR requests partial acknowledgement information of transmit buffer control when the single transmit buffer control is applied to multiple links, and (3) the BA agreement is a block ack agreement that is not a protected block agreement.

For a block ack agreement that is not a protected block agreement and that has larger BA buffer size (e.g., greater than 2048), both additional sequence number bits and no WinStartB/WinStartR Update indication are needed. In an embodiment, some bits in the Fragment Number subfield of the Block Ack Start Sequence Control field can be used to indicate the additional sequence number bits and to indicate no WinStart$_B$/WinStart$_R$ update. This solution can be used in compressed BARs and multi-TID BARs. In another embodiment, some reserved bits in the BAR Control field can be used to indicate the additional sequence number bits and no WinStart$_B$/WinStart$_R$ update in compressed BARs, and some reserved bits in the Per TID Info field can be used to indicate the additional sequence number bits and no WinStart$_B$/WinStart$_R$ update in multi-TID BARs. In still another embodiment, some reserved bits in the BAR Control field can be used to indicate the additional sequence number bits and no WinStart$_B$/WinStart$_R$ update.

BAR Update to Indicate BA Bitmap Size

Figure 8:
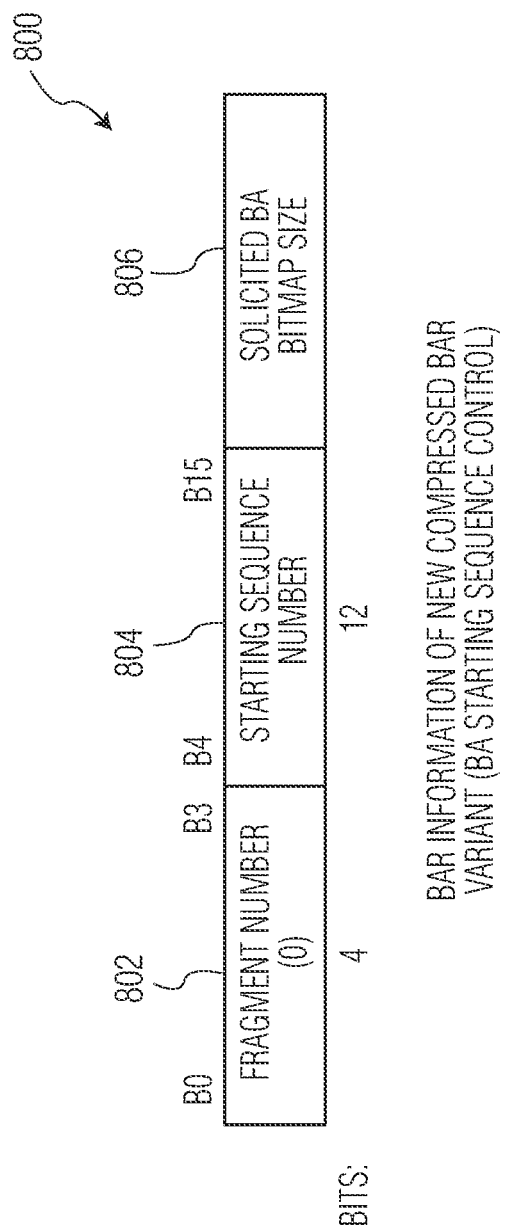
FIG. 8 shows a compressed BAR with a Solicited BA Bitmap Size field in accordance with an embodiment of the invention.

In some embodiments, as illustrated in FIG. 8, a new compressed BAR variant is defined where a new "Solicited BA Bitmap Size" field 806 is added to a BAR information field 800 in accordance with an embodiment of the invention. Thus, the BAR information field 800 of this new compressed BAR variant includes a Fragment Number field 802, a Starting Sequence Number field 804 and the new Solicited BA Bitmap Size field 806. The Solicited BA Bitmap Size field 806 carries the solicited BA bitmap size information. In a particular implementation, a value carried in the Solicited BA Bitmap Size field indicates the solicited BA bitmap size with the following mapping: "0" indicates a BA bitmap size of 32; "1" indicates a BA bitmap size of 64; "2" indicates a BA bitmap size of 128; "3" indicates a BA bitmap size of 256; "4" indicates a BA bitmap size of 512; and so on. In an embodiment, the recipient can respond with a smaller BA bitmap size if fewer frames are acknowledged. This new compressed BAR variant can be applied to multi-user (MU)-BARs.

Figure 9:
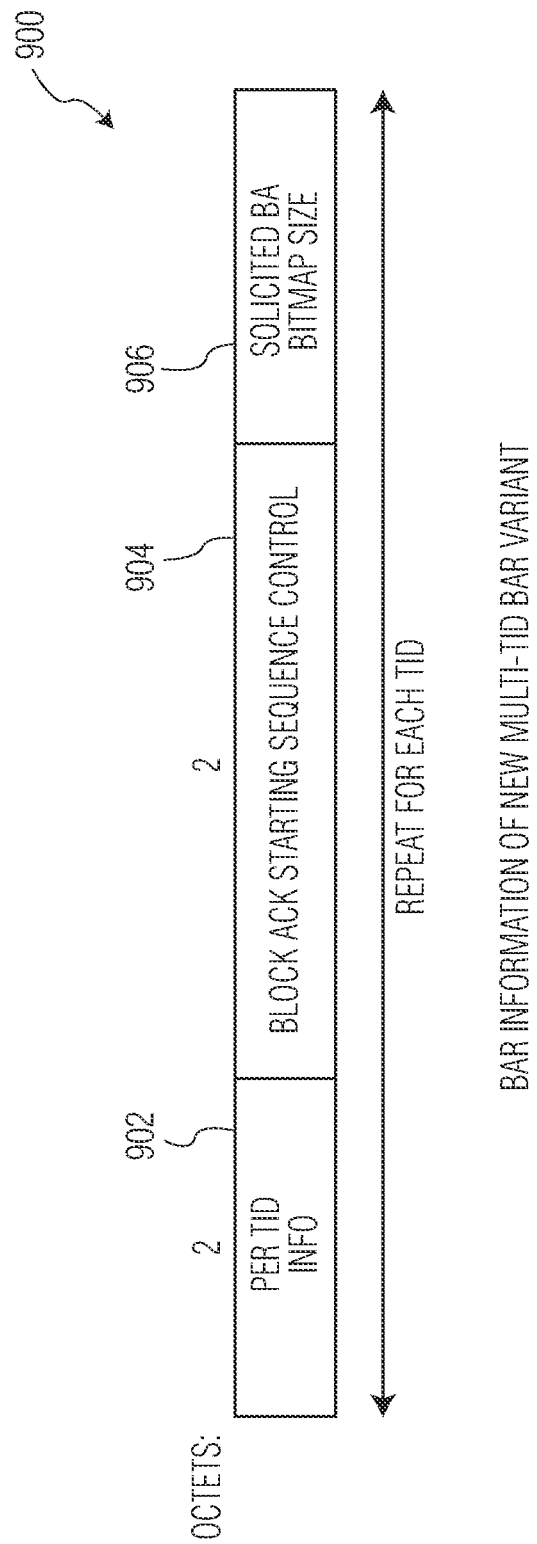
FIG. 9 shows a new multi-traffic identification (TID) BAR with a Solicited BA Bitmap Size field in accordance with an embodiment of the invention.

In some embodiments, as illustrated in FIG. 9, a new multi-TID BAR variant is defined where a new "Solicited BA Bitmap Size" field 906 is added to a BAR information field 900 in accordance with an embodiment of the invention. Thus, the BAR information field 900 of this new multi-TID BAR variant includes a Per TID Info field 902, a Block Ack Starting Sequence Control field 904 and the new Solicited BA Bitmap Size field 906. The Solicited BA Bitmap Size field 906 carries the solicited BA bitmap size. In a particular implementation, a value carried in the Solicited BA Bitmap Size field indicates the solicited BA bitmap size with the following mapping: "0" indicates a BA bitmap size of 32; "1" indicates a BA bitmap size of 64; "2" indicates a BA bitmap size of 128; "3" indicates a BA bitmap size of 256; "4" indicates a BA bitmap size of 512; and so on. In an embodiment, the recipient can respond with a smaller BA bitmap size if fewer frames are acknowledged. This new multi-TID BAR variant can be applied to MU-BARs.

Explicit Indication

In an A-MPDU where the A-MPDU transmitter wants smaller BA bitmap size, the updated (multi-TID or compressed) BAR is aggregated. In an embodiment, the ack policy of the QoS Data frame is set to 00 (Implicit Block Ack Request). If aggregated BAR is missing, the BA bitmap size defined by the negotiated BA buffer size is used. In another embodiment, the ack policy of the QoS Data frame is set to 11 (Block Ack). If aggregated BAR is missing, the recipient of the A-MPDU will not respond with a BA.

If the updated BAR is a multi-TID BAR, then the updated multi-TID BAR is in a multi-TID A-MPDU. If the updated BAR is a compressed BAR, then the updated compressed BAR is in a single-TID A-MPDU. A variant to this is that a multi-TID BAR with one pair of Per TID Info and Block Ack Starting Sequence Control is used in a single-TID A-MPDU, which provides the space for including the additional sequence number bits.

In some embodiments, using an updated MU-BAR, an AP may indicate whether the AP wants smaller BA bitmap size for each TID from each solicited STA.

HE (High Efficiency) Control to Indicate BA Bitmap Size

In some embodiments, the HE Control field may be used to indicate the BA bitmap size. In these embodiments, the Starting Sequence Control field and the Solicited BA Bitmap Size field are added to the HE Control field. In order to support multi-TID A-MPDUs, the TID should also be added to the HE Control field. A variant to this is that the TID in the QoS Data frames is used. In an embodiment, the HE Control fields in the QoS Data frames of different TIDs are different.

Indication of Additional Sequence Number

In some embodiments, each STA/AP announces whether it supports greater than 12-bit sequence number through a management frame in EHT Capabilities element, Extended Capabilities element or other elements. In some embodiments, all EHT STAs/APs may support greater than 12-bit sequence number, and there would be no need for any announcement.

Figure 10:
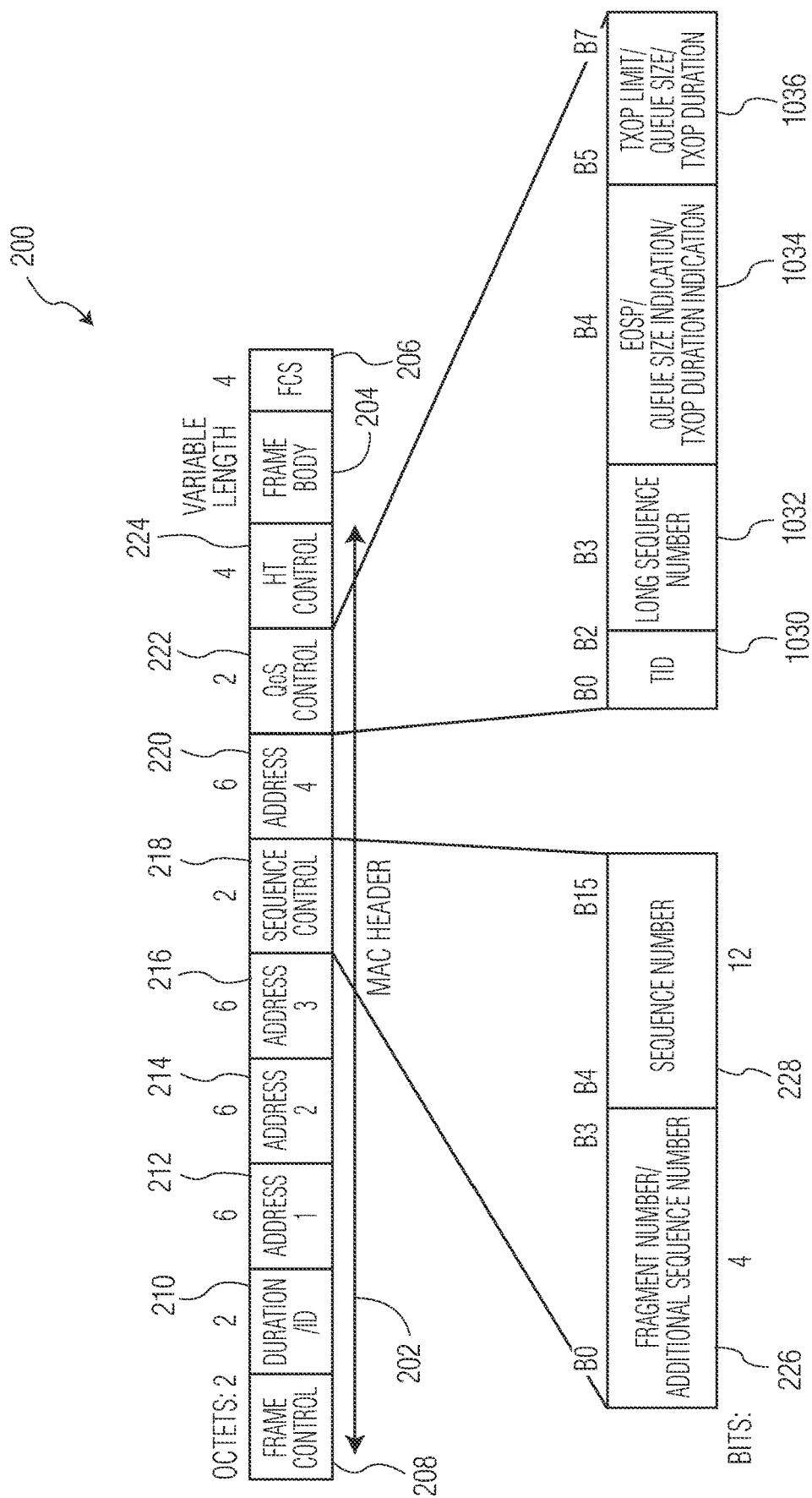
FIG. 10 shows a BAR with a TID field of a quality of service (QoS) Control field in a MAC header in accordance with an embodiment of the invention.

In an embodiment, one bit in the TID field of the QoS Control field in the MAC header of a frame, such as a BAR, indicates whether the additional sequence number is carried in the frame. As an example, FIG. 10 shows the BAR 200 with a TID field 1030 of the QoS Control field 222 in the MAC header 202 in accordance with an embodiment of the invention. In this example, the QoS Control field 222 includes the TID field 1030, a Long Sequence Number field 1032, a "EOSP/Queue Size Indication/TXOP Duration Indication" field 1034 and a TXOP Limit/Queue Size/TXOP duration field 1036. If the TID field 1030 indicates that the additional sequence number is carried in the frame, the additional sequence number is carried in the Fragment Number field 226 of the Sequence Control field 218 of the MAC header 202. In this embodiment, the transmit opportunity (TXOP) holder that supports greater than 12-bit sequence number transmits the frames by using greater than 12-bit sequence number if the recipient of the frames supports greater than 12-bit sequence number.

Figure 11:
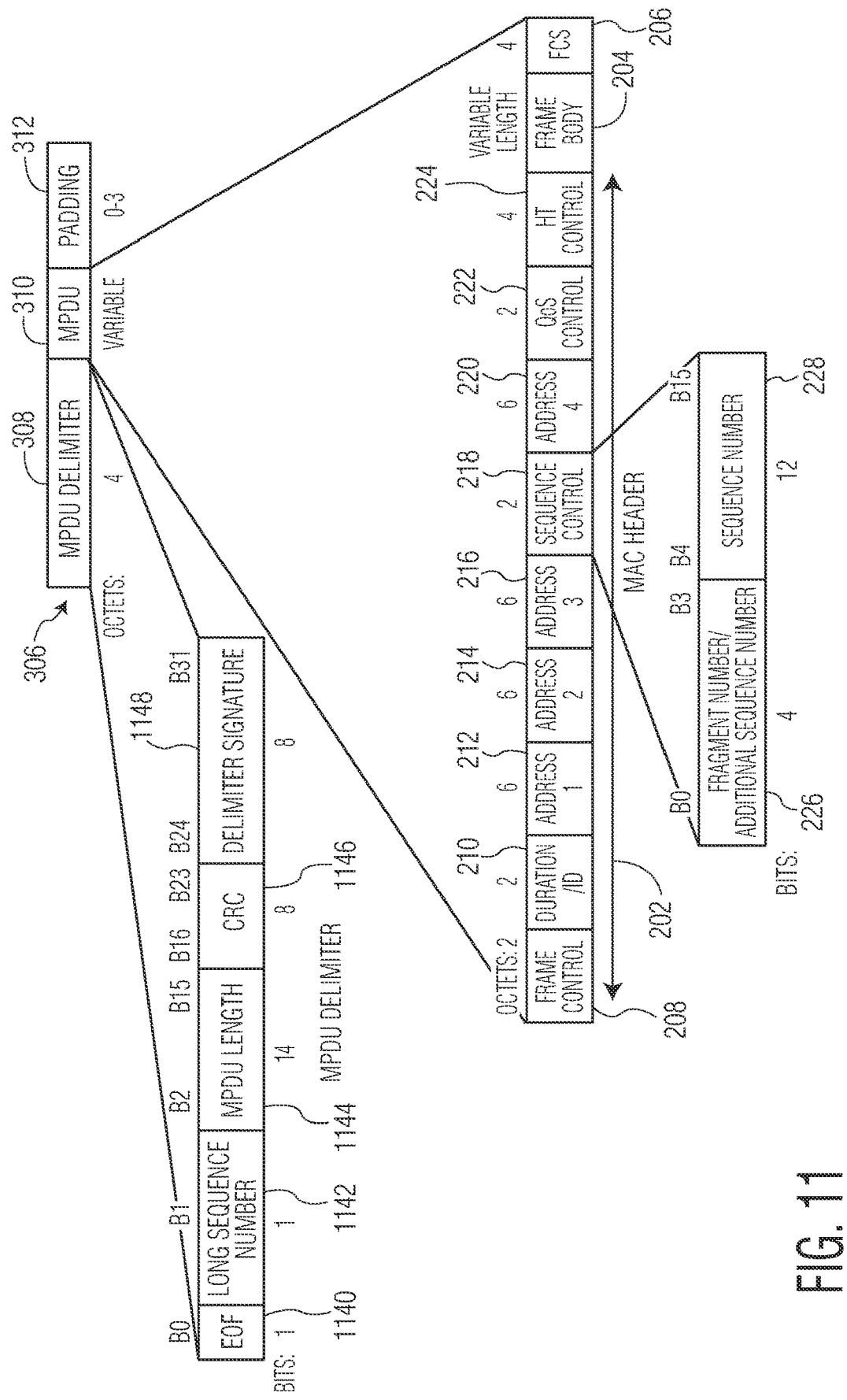
FIG. 11 shows a Long Sequence Number field of an MPDU Delimiter of an A-MPDU subframe in accordance with an embodiment of the invention.

In another embodiment, one bit in the MPDU Delimiter of a A-MPDU subframe, e.g., redefining the reserved B1 as Long Sequence Number field, indicates whether the additional sequence number carried in the MPDU that follows MPDU Delimiter are the additional sequence number bits. As an example, FIG. 11 shows a Long Sequence Number field 1140 of the MPDU Delimiter 308 of an A-MPDU subframe 306, which also includes the MPDU 310 and the Padding 312, in accordance with an embodiment of the invention. In this example, the MPDU 310 is a BAR, such as the BAR 200. Thus, the MPDU 310 includes all the components of the BAR 200. As shown in FIG. 11, the MPDU Delimiter 308 includes an EOF field 1140, the Long Sequence Number field 1142, an MPDU Length field 1144, a cyclic redundancy check (CRC) field 1146 and a Delimiter Signature field 1148. If the MPDU Delimiter 308 indicates that the additional sequence number is carried in the subframe 306, the additional sequence number is carried in the Fragment Number field 226 of the Sequence Control field 218 in the MAC header 202 of the MPDU 310 in the A-MPDU subframe 306. Again, in this embodiment, the TXOP holder that supports greater than 12-bit sequence number transmits the frames by using greater than 12-bit sequence number if the recipient of the frames supports greater than 12-bit sequence number.

BA for Larger BA Buffer Size

In some embodiments, different techniques may be applied to acknowledge QoS data frames. In an embodiment, one Block Ack Bitmap field in a compressed BA or in a multi-STA BA can be used to acknowledge QoS data frames of a TID from an A-MPDU source. In another embodiment, multiple Block Ack Bitmap fields in a compressed BA or in a multi-STA BA can be used to acknowledge QoS data frames of a TID from an A-MPDU source. In both embodiments, the additional lengths of Block Ack Bitmap field may be 512 bits, 1024 bits, 2048 bits and 4096 bits.

In some embodiments, the length of the Block Ack Bitmap field of a BA may be indicated using different techniques. In an embodiment, several bits in the Fragment Number field of the Starting Sequence Number Control field can be used to indicate that the Block Ack Bitmap field is more than 256 bits. For example, the third bit (B3) being 1 in the Fragment Number field may indicate that the Block Ack Bitmap field is greater than 256 bits and additional one or two bits in the Fragment Number field may further indicate one of the various lengths.

In some embodiments, the following table can be used to indicate a 512-bit BA Bitmap size and a 1024-bit BA Bitmap size using the Fragment Number field in Compressed Block Ack, Multi-STA Block Ack: 512-bit BA bitmap is indicated by the B3 of Fragment Number field equal to 1, B2 and B1 of Fragment Number field equal to 0, B0 of Fragment Number field equal to 0; 1024-bit BA bitmap is indicated by the B3 of Fragment Number field equal to 1, B2 and B1 of Fragment Number field equal to 1, B0 of Fragment Number field equal to 0.

| Fragment Number subfield | | | Fragmentation | Block Ack Bitmap subfield | Maximum number of |
|---|---|---|---|---|---|
| B3 | B2-B1 | B0 | Level 3 (ON/OFF) | length (octets) | MSDUs/A-MSDUs that can be acknowledged |
| 0 | 0 | 0 | OFF | 8 | 64 |
| 0 | 1 | 0 | | Reserved | Reserved |
| 0 | 2 | 0 | | 32 | 256 |
| 0 | 3 | 0 | | Reserved | Reserved |
| 0 | 0 | 1 | ON | 8 | 16 |
| 0 | 1 | 1 | | Reserved | Reserved |
| 0 | 2 | 1 | | 32 | 64 |
| 0 | 3 | 1 | | Reserved | Reserved |
| 1 | 0 | 0 | OFF | 64 | 512 |
| 1 | 1 | 0 | | 128 | 1024 |
| 1 | 2 and 3 | 0 | | Reserved | Reserved |
| 1 | Any | 1 | | Reserved | Reserved |

NOTE-
A Compressed BlockAck frame with B0 of the Fragment Number subfield set to 1 is not sent to an HE STA whose Dynamic Fragmentation Support subfield in the HE Capabilities element it transmits is not set to 3.
NOTE-
A Multi-STA BlockAck frame with B0 of the Fragment Number subfield set to 1 cannot be sent to an HE STA unless the HE Capabilities element received from the HE STA has the Dynamic Fragmentation Support subfield equal to 3.

In another embodiment, the reserved bits in the BA Control field can be used to indicate that the Block Ack Bitmap field is more than 256 bits. In some implementation, this approach may be used only in Compressed BAs.

In some embodiments, the presence of additional number bits (e.g., with greater than 4096 sequence number space) may be indicated using different techniques. In an embodiment, one or more bits (e.g., two bits) in the Fragment Number field of the Starting Sequence Number Control field can be used to indicate the additional sequence number bits. Additional two bits with the current Sequence Number field have 16384 sequence number space.

In another embodiment, the reserved bits in the BA Control field can be used to indicate that the Block Ack Bitmap field carries the additional sequence number bits. In some implementation, this approach may be used only in compressed BAs.

Figure 12:
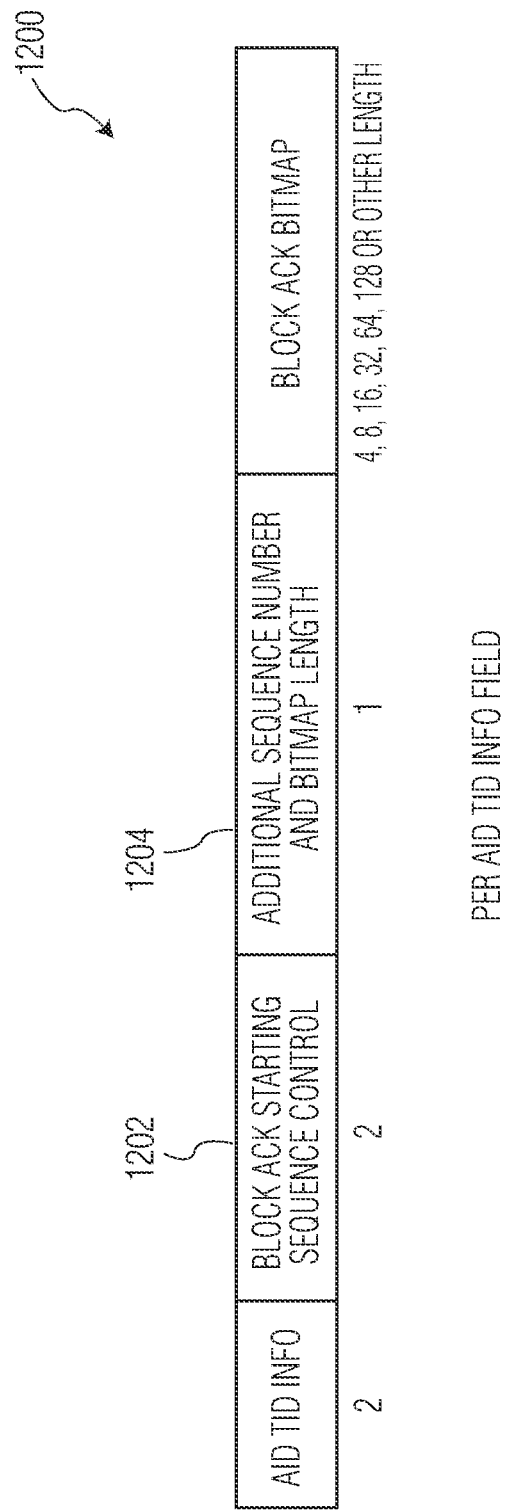
FIG. 12 shows an Additional Sequence Number And Bitmap Length field that follows a Block Ack Start Sequence Control field in a Per AID TID Info field of a BA in accordance with an embodiment of the invention.

In still another embodiment, the B3 bit in the Fragment Number field can be used to indicate that an Additional Sequence Number And Bitmap Length field, which can indicate 1 octet, 2 octets or other length, follows the Block Ack Start Sequence Control field in the Per AID TID Info field of the BA. In an embodiment, the Additional Sequence Number And Bitmap Length field includes an Additional Sequence Number subfield (e.g., a 2-bit subfield) and an additional Bitmap Length subfield (e.g., a 2-bit subfield). When the B3 bit and the B0 bit in the Fragment Number field have a value of 1, the Additional Bitmap Length subfield can indicate the Block Ack Bitmap fields with length of 64 octets, 128 octets or other length. FIG. 12 illustrates an Additional Sequence Number And Bitmap Length field 1204 that follows a Block Ack Start Sequence Control field 1202 in a Per AID TID Info field 1200 of a BA in accordance with an embodiment of the invention.

In still another embodiment, the Additional Sequence Number field is not transmitted in the BA frames. In this embodiment, the Start Sequence Number field indicates the 12-bit LSB of the start sequence number of the acknowledged QoS Data frames. The Fragment Number field indicates the BA bitmap size. The value in the Additional Sequence Number field of the frame with the smallest sequence number identified by a BA bitmap is same as the additional sequence number bits in the solicited BAR or A-MPDU. When BAR is not allowed to be aggregated with QoS Data frames in an A-MPDU, the QoS Data frames in an A-MPDU can solicit BA if all the QoS Data frames have the same value in their Additional Sequence Number fields. As an alternative, in the HE Control field, the smallest value of the Additional Sequence Number field of a TID of QoS Data frame is carried.

Figure 13:
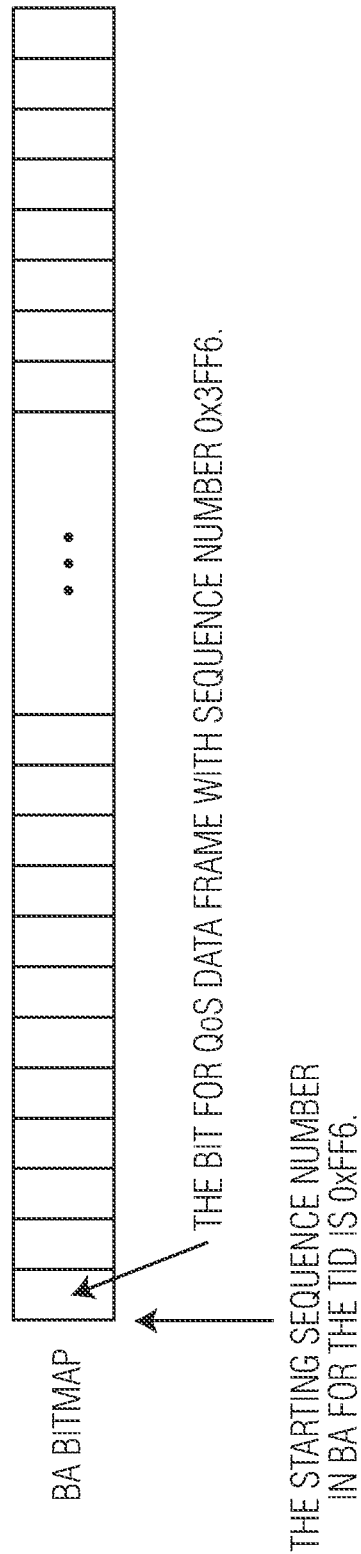
FIG. 13 shows an example of a BA operation in accordance with an embodiment of the invention.

An example of a BA operation in accordance with this embodiment is illustrated in FIG. 13. Let's assume that in the soliciting BAR, the Additional Sequence Number field (2 bits) has values of "11". The BA Start Sequence Number for the TID has value 0x3FF6.

In some embodiments, when the maximal Block Ack Bitmap field is no more than VALUE1 (e.g., 1024), the block ack for QoS Data frames of a TID greater than VALUE1 from an A-MPDU source can be carried in multiple Block Ack Bitmap fields, which can be in a multi-STA BA or can be in an enhanced compressed BA where multiple Block Ack Bitmap fields are in the BA Information field.

In some embodiments, when a multi-STA BA is addressed to STAs that do not support Block Ack Bitmap field greater than 256 bits and to STAs that support Block Ack Bitmap field greater than 256-bit, the Bitmap field greater than 256 bits will not be carried in the multi-STA BA. In an alternative embodiment, the Per AID TID Info fields with Block Ack Bitmap fields greater than 256 bits are carried after the Per AID TID Info fields with Block Ack Bitmap fields less than or equal to 256 bits.

Methods to Decrease BA Size and/or Transmission Time

In some embodiments, instead of transmitting a BA in a non-HT duplicated physical protocol data unit (PPDU), the BA is carried in a very High Throughput (VHT)/High Efficiency (HE)/Extremely High Throughput (EHT) PPDU greater than 20 MHz. When a HE/EHT PPDU is used and there is no basic service set (BSS) color collision, the TXOP field in the PHY header carries the remaining TXOP duration with granularity of 8 us/256 us, as defined in IEEE 802.11ax. In order to be fair to legacy neighbor STAs in 2.4/5 GHz band, Contention-Free End Beacon (CF-End) in not-HT duplicated PPDU may be transmitted at the end of the TXOP to avoid EIFS recovery.

In some embodiments, the BA bitmap length selection is based on the difference of sequence numbers of the acknowledged frames instead of the negotiated BA buffer size. For example, when the negotiated BA buffer size is 1024 and the difference of sequence numbers of acknowledged frames is less than 64, a single 64-bit Block Ack Bitmap field is used. The Block Ack Bitmap field can have length Value1 (e.g., 64) if the following conditions are true: (1) the negotiated BA size is more than Value1 and no more than Value2 (e.g., the negotiated BA size is 1024 as Value2 and Value1 is 64) where Value1 and Value2 are the allowed BA bitmap sizes in one Block Ack Bitmap field, (2) the difference between the largest sequence number and the smallest sequence number of the acknowledged frames is less than Value1 (the sequence number difference of the received QoS Data frames of the TID is less than 64), and (3) a single Block Ack Bitmap is used for a TID.

In some embodiments, a BAR is carried in an A-MPDU to announce the starting sequence number of the solicited BA. The HE Control in an MPDU may announce the Starting Sequence Number of the solicited BA.

In some embodiments, the smallest sequence number in an A-MPDU that solicits BA is the starting sequence number of the solicited BA. For unprotected BA agreement, the BAR carries the indication about whether the starting sequence number of the scoreboard context buffer and the reorder buffer is adjusted or not per the BAR frame. This can avoid frame discarding in reordering buffer and acknowledgement information discarding in scoreboard context buffer.

In some embodiments, multiple Block Ack Bitmap fields (or multiple Per AID TID Info fields) with same length or different length for a TID from an A-MPDU source are used to decrease the BA size. For example, when the negotiated BA buffer size is 768, one 512-bit Block Ack Bitmap field and one 256-bit Block Ack Bitmap field can be used to decrease the BA length. As another example, when the negotiated BA buffer size is 768, three 256-bit Block Ack Bitmap fields can be used to decrease the BA length.

In some embodiments, partial all 1's acknowledgement can be used to decrease the multi-STA BA size. In these embodiments, a QoS frame is acknowledged by the multi-STA BA frame if the following conditions are true: (1) three Per AID TID Info fields whose AID11 and TID are same respectively are continuously placed in a BA; (2) the Ack Type of the first Per AID TID Info field and the Ack Type of the third Per AID TID Info field are 0 (which indicates with BA Bitmap); (3) the Ack Type of the second Per AID TID Info field is 1 (which indicates without BA Bitmap and Block Ack Starting Sequence Control); (4) the sequence number of the frame is no less than the sum of the value in the Starting Sequence Number field of the first Per AID TID Info field and the length of Block Ack Bitmap in bits; and (5) the sequence number of the frame is less than the Starting Sequence Number field of the third Per AID TID Info field. For example, in this embodiment, if MPDU frames from 0 to 256 and from 800 to 1024 are partially received and MPDU frames from 257 to 799 are all correctly received, then a BA Bitmap for the MPDU frames from 257 to 799 are not transmitted in the multi-STA BA frame. For the MPDU frames from 0 to 256, an AID TID Info field, a Block Ack Starting Sequence Control field and a Block Ack Bitmap field are transmitted in the multi-STA BA frame. Similarly, for the MPDU frames from 800 to 1024, another AID TID Info field, another Block Ack Starting Sequence Control field and another Block Ack Bitmap field are transmitted in the multi-STA BA frame. However, for the MPDU frames from 257 to 799, only an AID TID Info field is transmitted in the multi-STA BA frame.

In some embodiments, a partial all 0's acknowledgement can be used to decrease the BA size. In one embodiment, a QoS frame is not acknowledged by the multi-STA BA frame if the following conditions are true: (1) two Per AID TID Info fields whose AID11 and TID are same respectively are continuously placed in a multi-STA BA; (2) the Ack Type of the first Per AID TID Info field and The Ack Type of the second Per AID TID Info field are 0 (with BA Bitmap); (3) the sequence number of the frame is no less than the sum of the value in the Starting Sequence Number field of the first Per AID TID Info field and the length of Block Ack Bitmap in bits; and (4) the sequence number of the frame is less than the value in the Starting Sequence Number field of the second Per AID TID Info field. For example, in this embodiment, if MPDU frames from 0 to 256 and from 800 to 1024 are partially received and MPDU frames from 257 to 799 are all correctly received, then the MPDU frames from 257 to 799 are not acknowledged in the multi-STA BA frame. For the MPDU frames from 0 to 256, an AID TID Info field, a Block Ack Starting Sequence Control field and a Block Ack Bitmap field are transmitted in the multi-STA BA frame. Similarly, for the MPDU frames from 800 to 1024, another AID TID Info field, another Block Ack Starting Sequence Control field and another Block Ack Bitmap field are transmitted in the multi-STA BA frame. However, for the MPDU frames from 257 to 799, no information is transmitted in the multi-STA BA frame.

In another embodiment, a QoS frame is not acknowledged by the Compressed BA frame if the following conditions are true: (1) two combinations or sets of the Block Ack Starting Sequence Control field plus the Block Ack Bitmap field are continuously placed in a multi-STA BA, (2) the sequence number of the frame is no less than the sum of the value in the Starting Sequence Number field of the first Block Ack Starting Sequence Control field and the length of the first Block Ack Bitmap in bits; and (3) and the sequence number of the frame is less than the value in the Starting Sequence Number field of the second Block Ack Starting Sequence Control field. For example, in this embodiment, if MPDU frames from 0 to 256 and from 800 to 1024 are partially received and MPDU frames from 257 to 799 are all correctly received, then the MPDU frames from 257 to 799 are not acknowledged in the Compressed BA frame. For the MPDU frames from 0 to 256, a Block Ack Starting Sequence Control field and a Block Ack Bitmap field are transmitted in the Compressed BA frame. Similarly, for the MPDU frames from 800 to 1024, another Block Ack Starting Sequence Control field and another Block Ack Bitmap field are transmitted in the Compressed BA frame. However, for the MPDU frames from 257 to 799, no information is transmitted in the Compressed BA frame.

BSS Operating Parameter Announcement

In some embodiments, for greater than 80 MHz bandwidth (BW), the channel segment center frequency 0 and the channel segment center frequency 1 decide whether one or two channel segments exist in the BSS. When BSS BW is greater than or equal to 160/80+80 MHz, the BW in the HE/VHT operating channel, the channel segment center frequency 0, the channel segment center frequency 1 are used. The channel segment center frequency 0 and the channel segment center frequency 1 are used for greater than 160/80+80 MHz BW.

In some embodiments, static channel puncture is announced through a 20 MHz available channel bitmap. In an embodiment, for 240 MHz BW announcement, 240 MHz BSS is a 320 MHz BSS with 80 MHz channel being punctured. In another embodiment, 240 MHz is announced by the BW field.

In some embodiments, the announced BSS operating BW for HE STA is no more than the maximal BW of the subchannel that includes primary 20 MHz channel and does not include any punctured 20 MHz channel A variant to this is that the channel width in operating mode notification is no more that the maximal BW of the subchannel that includes primary 20 MHz channel and does not include any punctured 20 MHz channel.

In some embodiments, for a BW less than or equal to 60 MHz/80 MHz+80 MHz, the EHT MCS and NSS are no less than the HE MCS, NSS respectively.

Figure 14:
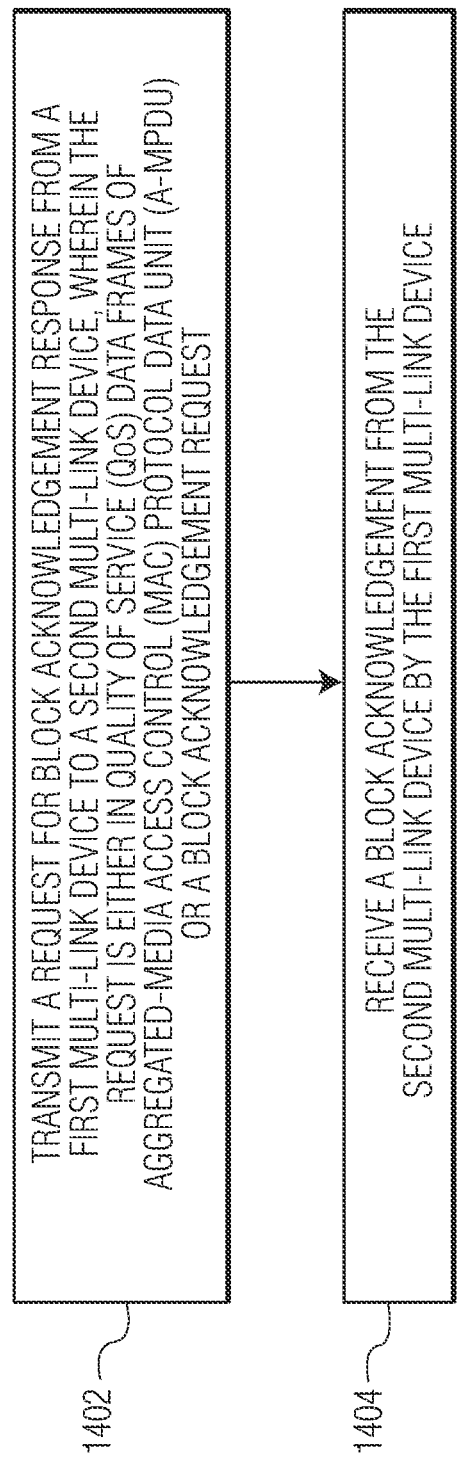
FIG. 14 is a flow diagram of a method of managing block acknowledgement operations in a multi-link communications system in accordance with embodiments of the invention.

A method of managing block acknowledgement operations in a multi-link communications system in accordance with embodiments of the invention is now described with reference to a flow diagram of FIG. 14. At step 1402, a request for block acknowledgement response is transmitted from a first multi-link device to a second multi-link device, wherein the request is either in quality of service (QoS) data frames of aggregated-media access control (MAC) protocol data unit (A-MPDU) or a block acknowledgement request. At step 1404, a block acknowledgment from the second multi-link device is received by the first multi-link device.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of managing block acknowledgement operations in a multi-link communications system, the method comprising:
    transmitting a request for block acknowledgement response from a first multi-link device to a second multi-link device, wherein the request is either in quality of service (QoS) data frames of aggregated-media access control (MAC) protocol data unit (A-MPDU) or a block acknowledgement request; and
    receiving a block acknowledgment from the second multi-link device by the first multi-link device;
    wherein the block acknowledgement request includes an indication whether a recipient of the block acknowledgement request needs to update at least one of WinStartB and WinStartR value when a block acknowledgement agreement with the recipient is a non-protected block agreement.

2. The method of claim 1,
    wherein the request for block acknowledgement response includes sequence number bits in a starting sequence number field and additional sequence number bits in another field of the request.

3. The method of claim 2,
    wherein the additional sequence number bits are in a fragment number field of a block ack start sequence control field in the request.

4. The method of claim 1,
    wherein one block acknowledgement bitmap field in the block acknowledgement is used to acknowledge QoS data frames of a traffic identification (TID) from an A-MPDU source.

5. The method of claim 1,
    wherein a plurality of bits in a fragment number field of a starting sequence number control field of a block acknowledgement information field in the block acknowledgement indicates that a block acknowledgment bitmap field is more than 256 bits and also indicates size of the block acknowledgment bitmap field.

6. The method of claim 5,
    wherein B3 of fragment number field being equal to 1, B0 of fragment number field being equal to 0 and various values of B2 and B1 of fragment number field indicate the block acknowledgment bitmap field with bit length of 512 or 1024.

7. The method of claim 1,
    wherein the block acknowledgement is carried in greater than 20 MHz Extremely High Throughput (EHT) physical protocol data unit (PPDU).

8. The method of claim 1,
    wherein a block acknowledgement bitmap length of the block acknowledgement is based on a difference of sequence numbers of acknowledged frames instead of a negotiated block acknowledgement buffer size.

9. The method of claim 1,
wherein the block acknowledgement request is carried in an A-MPDU to announce a starting sequence number of a solicited block acknowledgement.

10. A multi-link communications system comprising:
a first multi-link device; and
a second multi-link device,
wherein the first multi-link device is configured to transmit a request for block acknowledgment response to the second multi-link device, wherein the request is either in quality of service (QoS) data frames of aggregated-media access control (MAC) protocol data unit (A-MPDU) or a block acknowledgement request,
wherein the second multi-link device is configured to transmit a block acknowledgment to the second multi-link device; and
wherein the request includes an indication whether a recipient of the request needs to update at least one of WinStartB and WinStartR value when a block acknowledgement agreement with the recipient is a non-protected block agreement.

11. The multi-link communications system of claim 10,
wherein the request for block acknowledgement response includes sequence number bits in a starting sequence number field and additional sequence number bits in another field of the request.

12. The multi-link communications system of claim 11,
wherein the additional sequence number bits are in a fragment number field of a block ack start sequence control field in the request.

13. The multi-link communications system of claim 9,
wherein one block acknowledgement bitmap field in the block acknowledgement is used to acknowledge QoS data frames of a traffic identification (TID) from an A-MPDU source.

14. The multi-link communications system of claim 9,
wherein a plurality of bits in a fragment number field of a starting sequence number control field of a block acknowledgement information field in the block acknowledgement indicates that a block acknowledgment bitmap field is more than 256 bits and also indicates size of the block acknowledgment bitmap field.

15. The multi-link communications system of claim 14,
wherein B3 of fragment number field being equal to 1, B0 of fragment number field being equal to 0 and various values of B2 and B1 of fragment number field indicate the block acknowledgment bitmap field with bit length of 512 or 1024.

16. The multi-link communications system of claim 9,
wherein a block acknowledgement bitmap length of the block acknowledgement is based on a difference of sequence numbers of acknowledged frames instead of a negotiated block acknowledgement buffer size.

17. The method of claim 8:
wherein the block acknowledgement bitmap length of the block acknowledgement is based on a difference of sequence numbers of acknowledged frames instead of the negotiated block acknowledgement buffer size when the difference of sequence numbers is less than the negotiated block acknowledgement buffer size.

18. The multi-link communications system of claim 16:
wherein the block acknowledgement bitmap length of the block acknowledgement is based on a difference of sequence numbers of acknowledged frames instead of the negotiated block acknowledgement buffer size when the difference of sequence numbers is less than the negotiated block acknowledgement buffer size.

19. A method of managing block acknowledgement operations in a multi-link communications system, the method comprising:
transmitting a request for block acknowledgement response from a first multi-link device to a second multi-link device, wherein the request is either in quality of service (QoS) data frames of aggregated-media access control (MAC) protocol data unit (A-MPDU) or a block acknowledgement request; and
receiving a block acknowledgment from the second multi-link device by the first multi-link device;
wherein a block acknowledgement bitmap length of the block acknowledgement is based on a difference of sequence numbers of acknowledged frames instead of a negotiated block acknowledgement buffer size; and
wherein the block acknowledgement bitmap length of the block acknowledgement is based on a difference of sequence numbers of acknowledged frames instead of the negotiated block acknowledgement buffer size when the difference of sequence numbers is less than the negotiated block acknowledgement buffer size.

* * * * *